US010754684B2

(12) United States Patent
Li et al.

(10) Patent No.: US 10,754,684 B2
(45) Date of Patent: Aug. 25, 2020

(54) METHOD FOR CONTROLLING PROCESS AND RELATED DEVICE

(71) Applicant: Guangdong Oppo Mobile Telecommunications Corp., Ltd., Dongguan, Guangdong (CN)

(72) Inventors: Hui Li, Guangdong (CN); Yuanqing Zeng, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 93 days.

(21) Appl. No.: 16/122,390

(22) Filed: Sep. 5, 2018

(65) Prior Publication Data

US 2018/0365050 A1   Dec. 20, 2018

Related U.S. Application Data

(63) Continuation of application No. PCT/CN2017/086578, filed on May 31, 2017.

(30) Foreign Application Priority Data

May 31, 2016  (CN) .......................... 2016 1 0380762

(51) Int. Cl.
```
G06F 3/00       (2006.01)
G06F 9/44       (2018.01)
G06F 9/46       (2006.01)
G06F 13/00      (2006.01)
G06F 9/48       (2006.01)
G06F 9/50       (2006.01)
```
(52) U.S. Cl.
CPC ............ *G06F 9/485* (2013.01); *G06F 9/4881* (2013.01); *G06F 9/5016* (2013.01); *G06F 9/5038* (2013.01)

(58) Field of Classification Search
CPC ........................................................ G06F 9/548
USPC ........................................................ 719/103
See application file for complete search history.

(56) References Cited

U.S. PATENT DOCUMENTS

| 5,943,232 A | 8/1999 | Gehi et al. |
| 2002/0194436 A1 | 12/2002 | McKenney |

(Continued)

FOREIGN PATENT DOCUMENTS

| CN | 1567233 A | 1/2005 |
| CN | 1629821 A | 6/2005 |
| CN | 1924810 A | 3/2007 |

(Continued)

OTHER PUBLICATIONS

Extended European search report issued in corresponding European application No. 17805846.7 dated Jan. 21, 2019.

(Continued)

*Primary Examiner* — Timothy A Mudrick

(57) ABSTRACT

A method for controlling process includes the follows. When it is determined that a duration that each of N processes in a kernel space of a terminal device is in an uninterruptible sleep state reaches or exceeds a preset period, whether the N processes have undergone a searched and killed operation within the preset period is detected. N is an integer greater than or equal to 1. When the N processes have undergone the searched and killed operation within the preset period, states of the N processes are changed, and an operating system is controlled to run the N processes according to the changed states of the N processes. A related terminal device is also provided.

20 Claims, 4 Drawing Sheets

(56) References Cited

U.S. PATENT DOCUMENTS

2012/0324481 A1 12/2012 Xia et al.
2014/0344824 A1 11/2014 Brock et al.

FOREIGN PATENT DOCUMENTS

| CN | 102819466 A | 12/2012 |
|---|---|---|
| CN | 103514053 A | 1/2014 |
| CN | 104023147 A | 9/2014 |
| CN | 104391740 A | 3/2015 |
| CN | 105022665 A | 11/2015 |
| CN | 105260019 A | 1/2016 |

OTHER PUBLICATIONS

Silberschatz A et al: "Operating System Concepts—Fourth Edition", Operating System Concepts, Jan. 1, 1994.
European Examination Report issued in corresponding European Application No. 17805846.7 dated Jan. 16, 2020.

METHOD FOR CONTROLLING PROCESS AND RELATED DEVICE

CROSS-REFERENCE TO RELATED APPLICATION(S)

This application is a continuation of International Application No. PCT/CN2017/086578, filed on May 31, 2017, which claims priority to Chinese Patent Application No. 201610380762.8, filed on May 31, 2016, contents of which are hereby incorporated in their entireties by reference.

TECHNICAL FIELD

This disclosure relates to the field of electronic technology, and particularly to a method for controlling process and a related device.

BACKGROUND

For an operating system of mobile devices, a kernel space mainly includes various key functions of the operating system of mobile devices (such as process scheduling, memory management, interrupt response, user system call and so on). A process scheduling module mainly enables various processes to switch among different states. States of a process in the kernel generally include the follows: 1. running state; 2. executable state; 3. interruptible sleep state; 4. uninterruptible sleep state; 5. pause state; 6. exit state. The running state indicates that the process or thread has obtained central processing unit (CPU) resource and is running. The executable state indicates that the process can be run but does not obtain CPU resource. The uninterruptible sleep state indicates that the process is in the sleep state, but at this point the process cannot be interrupted. The interruptible sleep state indicates that the process is in the sleep state, but the process can be interrupted. The pause state indicates that the process is paused and cannot be run. The exit state indicates that the process begins to exit.

The existing of the uninterruptible sleep state is to indicate that some kernel procedures cannot be interrupted. If asynchronous signals are responded, a procedure for processing the asynchronous signals may be inserted into the execution procedure of a program (the inserted procedure may exist in a kernel mode and may extend to a user mode), thus the original procedure is interrupted. When a process operates some hardware (for example, the process calls a read-write system call to perform a read-write operation on a certain device file, the read-write system call finally executes codes corresponding to device drivers and interacts with corresponding physical devices), the process in the uninterruptible sleep state may be employed to realize protection, so as to avoid interruption of the interaction process between the process and the device and avoid that the device falls into an uncontrollable state. However, when a duration that a process is in the uninterruptible sleep state is long, the operating system may have a response delay, thereby affecting stability of the operating system.

SUMMARY

Implementations of the present disclosure provide a method for controlling process and a related device, which can improve the stability of an operating system.

According to a first aspect, the implementations of the present disclosure provide a method for controlling process which may include the follows. Whether N processes in a kernel space of a terminal device have undergone a searched and killed operation within a preset period is determined, when a duration that each of the N processes is in an uninterruptible sleep state exceeds the preset period, where N is an integer greater than or equal to 1. States of the N processes are changed based on a determination that the N processes have undergone the searched and killed operation within the preset period, and an operating system of the terminal device is controlled to run the N processes according to the changed states of the N processes.

According to a second aspect, the implementations of the present disclosure provide a terminal device. The terminal device may include at least one processor, and a computer readable memory coupled to the at least one processor and storing at least one computer executable instruction therein which, when executed by the at least one processor, causes the at least one processor to carry out actions. The actions may include the follows. Whether N processes in a kernel space of the terminal device have undergone a searched and killed operation within a preset period is determined, when a duration that each of the N processes is in an uninterruptible sleep state reaches or exceeds the preset period, where N is an integer greater than or equal to 1. States of the N processes are changed based on a determination that the N processes have undergone the searched and killed operation within the preset period, and an operating system of the terminal device is controlled to run the N processes according to the changed states of the N processes.

According to a third aspect, the implementations of the present disclosure further provide a terminal device. The terminal device may include at least one processor, and a computer readable memory coupled to the at least one processor and storing at least one computer executable instruction therein which, when executed by the at least one processor, causes the at least one processor to carry out actions. The actions may include the follows. Whether a duration that at least one process that is unable to be killed stays in a kernel space of the terminal device reaches or exceeds a preset period is determined. State of the at least one process is changed based on a determination that the duration that the at least one process stays in the kernel space reaches or exceeds the preset period, and an operating system of the terminal device is controlled to run the at least one process after the state of the at least one process is changed.

BRIEF DESCRIPTION OF THE DRAWINGS

To describe technical solutions in the implementations of the present disclosure more clearly, the following briefly introduces the accompanying drawings required for describing the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Figure 1:
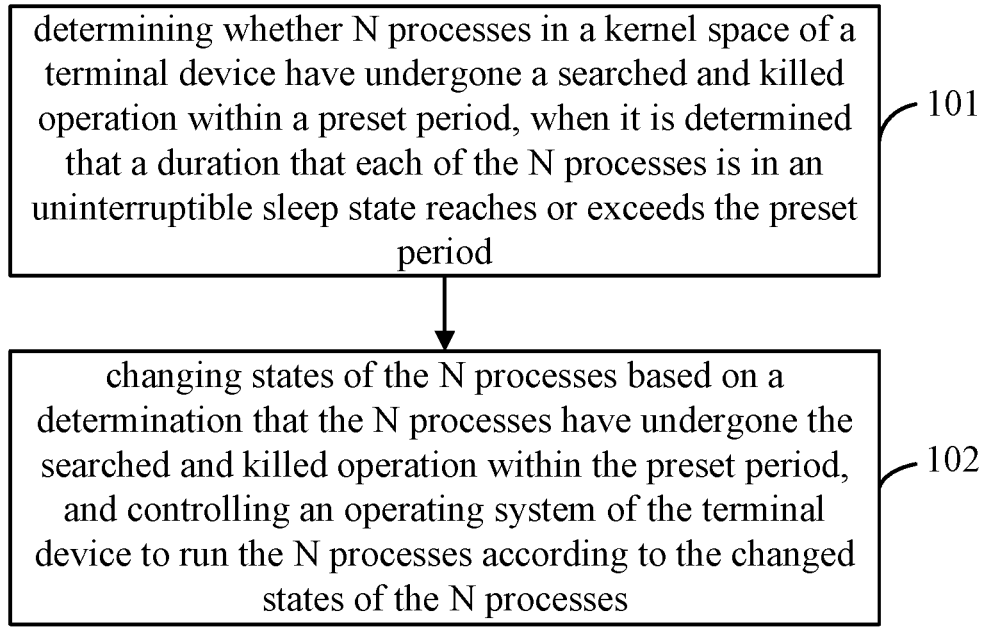
FIG. 1 is a schematic flow chart illustrating a method for controlling process according to an implementation of the present disclosure.

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The following will illustrate the implementations in detail, respectively.

The terms "first", "second", "third", "fourth", and the like used in the specification, the claims, and the accompany drawings of the present disclosure are used to distinguish different objects rather than describe a particular order. Additionally, the terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

In the following, some of the terms used herein are explained to facilitate the understanding for those skilled in the art.

Terminal device, also known as user equipment (UE), means a device that provides voice and/or data connectivity to a user, examples of which include hand-held devices with wireless connectivity function, on-board devices and the like. Common terminals include, for example, mobile phones, tablets, laptops, handheld computers, mobile internet devices (MID), and wearable equipment such as smart watches, smart bracelets, pedometers and so on.

The terms "a plurality of" or "multiple" means two or more than two. The term "and/or" is used to describe the association of associated objects and indicates that there can be three relationships. For example, "A and/or B" means three situations, that is, A alone, both A and B, and B alone. The character "/" generally indicates that the associated objects before and after the character are in an "OR" relationship.

According to the implementations of the present disclosure, a method for controlling process is provided. The method may include the follows. Whether N processes in a kernel space of a terminal device have undergone a searched and killed operation within a preset period is determined, when a duration that each of the N processes is in an uninterruptible sleep state reaches or exceeds the preset period, where N is an integer greater than or equal to 1. States of the N processes are changed based on a determination that the N processes have undergone the searched and killed operation within the preset period, and an operating system of the terminal device is controlled to run the N processes according to the changed states of the N processes.

In at least one implementation, the method may further include the follows before changing the states of the N processes. N storage spaces are allocated to the N processes, and the N storage spaces are in a one-to-one correspondence relationship with the N processes. Statistic information of the N processes is stored in the N storage spaces, correspondingly, and the statistic information of each of the N processes at least contains an identifier of the process.

In at least one implementation, the method may further include the follows before changing the states of the N processes. K groups of process sets are obtained by grouping the N processes, and each process set has processes of the same type. K storage spaces are allocated to the K groups of process sets, and the K storage spaces are in a one-to-one correspondence relationship with the K groups of process sets. Statistic information of the K groups of process sets is stored in the K storage spaces, correspondingly, and the statistic information of each of the N processes at least contains an identifier of the process.

In at least one implementation, the statistic information of one process further contains at least one of the follows: a state of the process before changing the state of the process, a duration that the process is in the uninterruptible sleep state, and a state of data information of the process.

In at least one implementation, when the N processes include at least one process generated when at least one system software of the terminal device is running, changing the states of the N processes and controlling the operating system to run the N processes according to the changed states of the N processes may include the follows. The states of all processes in the kernel space are changed to an exit state when one of the at least one process generated when the at least one system software is running causes the operating system to be abnormal, and the operating system is controlled to exit all processes in the kernel space and the operating system is restarted. The state of at least one of the N processes is changed to the exit state when none of the at least one process generated when the at least one system software is running causes the operating system to be abnormal, and the operating system is controlled to exit the at least one of the N processes.

In at least one implementation, changing the states of the N processes and controlling the operating system to run the N processes according to the changed states of the N processes may include the follows. The states of N−1 processes of the N processes are changed to a pause state when positions of resources occupied by the N processes are the same, and the operating system is controlled to pause the N−1 processes.

In at least one implementation, when the states of the N processes are changed to an exit state, the method may further include the follows after controlling the operating system to run the N processes according to the changed states of the N processes. The N processes are launched according to the statistic information of the N processes when a percentage of occupied resources of the kernel space is less than or equal to a first threshold, and the statistic information of each of the N processes at least contains an identifier of the process. W processes are selected from the N processes when the percentage of the occupied resources of the kernel space is greater than the first threshold and less than a second threshold, and the W processes are launched according to statistic information of the W processes. Priorities of the W processes are higher than or equal to that of processes of the N processes other than the W processes, and W is an integer greater than or equal to 1.

In at least one implementation, changing the states of the N processes may include changing the states of the N processes from the uninterruptible sleep state to an exit state or a pause state.

According to the implementations of the present disclosure, a terminal device is provided. The terminal device may include at least one processor, and a computer readable memory coupled to the at least one processor and storing at least one computer executable instruction therein which, when executed by the at least one processor, causes the at least one processor to carry out actions. The actions may include the follows. Whether N processes in a kernel space of a terminal device have undergone a searched and killed operation within a preset period is determined, when a duration that each of the N processes is in an uninterruptible sleep state reaches or exceeds the preset period, where N is an integer greater than or equal to 1. States of the N processes are changed based on a determination that the N processes have undergone the searched and killed operation within the preset period, and an operating system of the terminal device is controlled to run the N processes according to the changed states of the N processes.

According to the implementations of the present disclosure, another terminal device is provided. The terminal device may include at least one processor, and a computer readable memory coupled to the at least one processor and storing at least one computer executable instruction therein which, when executed by the at least one processor, causes the at least one processor to carry out actions. The actions may include the follows. Whether a duration that at least one process that is unable to be killed stays in a kernel space of the terminal device reaches or exceeds a preset period is determined. State of the at least one process is changed based on a determination that the duration that the at least one process stays in the kernel space reaches or exceeds the preset period, and an operating system of the terminal device is controlled to run the at least one process after the state of the at least one process is changed.

Referring to FIG. 1, FIG. 1 is a schematic flow chart illustrating a method for controlling process according to an implementation of the present disclosure. The method begins at block 101.

At block 101, when the terminal device detects that a duration that each of N processes in a kernel space of a terminal device is in an uninterruptible sleep state reaches or exceeds a preset period, the terminal device detects whether the N processes have undergone a searched and killed operation within the preset period. N is an integer greater than or equal to 1.

At block 102, when the N processes have undergone the searched and killed operation within the preset period, the terminal device changes states of the N processes, and controls an operating system of the terminal device to run the N processes according to the changed states of the N processes.

For example, the terminal device periodically detects states of all processes in the kernel space. Generally, a duration that a process is in the uninterruptible sleep state is very short. When the duration that each of the N processes in the kernel space is in the uninterruptible sleep state exceeds the preset period, under this condition, the operating system may have a response delay, thereby affecting the stability of the operating system. Thus, under this condition, the terminal device detects within the preset period whether the N processes have undergone a searched and killed operation performed by a watchdog program. Generally, when a process stays in a certain state for a long time and cannot exit, the watchdog program of the operating system is invoked to be run, and the watchdog program may kill the process. Uninterruption does not indicate an interruption that a central processing unit (CPU) does not respond to external hardware, but indicates that a process does not respond to asynchronous signals. All the asynchronous signals include searching and killing signals. That is to say, the watchdog program cannot immediately kill the process which is in the uninterruptible sleep state. When the terminal device detects that within the preset period the N processes have undergone the searched and killed operation performed by the watchdog program, the terminal device directly changes the states of the N processes. Finally, the terminal device controls the operating system to run the N processes according to the changed states of the N processes, thus a problem of the operating system generated by that some processes are in the uninterruptible sleep state for a long time can be avoided, thereby improving the stability of the operating system.

Changing the states of the N processes may be that the states of the N processes are changed from the uninterruptible sleep state to an exit state or to a pause state and so on, and the present disclosure is not limited thereto.

In at least one implementation, before changing the states of the N processes at block 102, the method illustrated in FIG. 1 further includes following operations. The terminal device allocates N storage spaces to the N processes, and the N storage spaces are in a one-to-one correspondence relationship with the N processes. The terminal device stores statistic information of the N processes in the N storage spaces, correspondingly.

For example, the existing of the uninterruptible sleep state indicates that some kernel procedures cannot be interrupted. When these procedures are interrupted, problems such as loss of data may be generated. Therefore, before changing the states of the N processes, temporary data of the N processes is first saved to ensure that after changing, these processes can be found when launched next time. Since the sizes of resources occupied by different processes are different, the size of temporary data of different processes which needs to be stored are not the same, the terminal device can allocate the N storage spaces to the N processes according to the sizes of resources occupied by the N processes, and then store the temporary data (i.e., statistic information) of the N processes in the N storage spaces, correspondingly.

In at least one implementation, before changing the states of the N processes at block 102, the method illustrated in FIG. 1 further includes following operations. The terminal device groups the N processes to obtain K groups of process sets, and types of the processes in each process set are the same. The terminal device allocates K storage spaces to the K groups of process sets, and the K storage spaces are in a one-to-one correspondence relationship with the K groups of process sets. The terminal device stores the statistic information of the K groups of process sets in the K storage spaces, correspondingly.

For example, the existing of the uninterruptible sleep state indicates that some kernel procedures cannot be interrupted. When these procedures are interrupted, problems such as loss of data may be generated. Therefore, before changing the states of the N processes, temporary data of the N processes is first saved to ensure that after changing, these processes can be found when launched next time. Since the types of different processes may be the same, for example, the processes are all processes that are generated when system software are running (hereinafter, system processes), are all processes that are generated when application software are run (hereinafter, application processes), or other. For the sake of easy management, the terminal device can first group the N processes to obtain the K groups of process sets (for example, N=4, the four processes includes a first process, a second process, a third process, and a fourth process, the type of the first process is the same as that of the second process, the type of the third process is the same as that of the fourth process, then after grouping, two groups of process sets are obtained, the first group of process sets includes the first process and the second process, and the second group of process sets includes the third process and the fourth process), and then allocates the K storage spaces to the K groups of process sets, and stores temporary data (i.e., statistic information) of the K groups of process set in the K storage spaces, correspondingly.

In at least one implementation, the statistic information of a process includes an identifier of the process (each time the operating system runs a process, the operating system creates a process ID, the process ID is the identifier of the process, and the identifier of the process is used to distinguish different processes). The statistic information of a process may further include at least one of the follows: a state of the process before the state of the process is changed (for example, before the state of a process A is changed, the state of the process A is the uninterruptible sleep state, then the statistic information herein is the uninterruptible sleep state), a duration that the process is in the uninterruptible sleep state (for example, when a duration that the process A is in the uninterruptible sleep state is two seconds, the statistic information herein is two seconds), and state of data information of the process (for example, when the process A has finished loading of data or has transmitted 50% of data, the statistic information herein is that loading of data has finished or 50% of data has been transmitted). Certainly, the above statistic information is not limited to this information, and the present disclosure is not limited thereto.

In at least one implementation, when the N processes include at least one system process, a specific implementation manner of the operation at block 102 includes the follows. When the at least one system process includes one system process which can affect normal operation of the operating system, that is, when one of the at least one system process can cause the operating system to be abnormal, the terminal device changes the states of all of the processes in the kernel space to an exit state, and controls the operating system to exit all of the processes in the kernel space and restarts the operating system. When none of the at least one system process can affect the normal operation of the operating system, that is, when none of the at least one system process can cause the operating system to be abnormal, the terminal device changes the state of at least one of the N processes to the exit state, and controls the operating system to exit the at least one process.

For example, the processes run by the operating system may be the system processes (for example, a power management process, an activity manager process, a call process, and so on), and may be application processes (for example, processes generated when third-party applications such as a music application for playing music and a game application for playing games are run), and so on. When the N processes includes at least one system process, and the at least one system process includes one system process which can affect the normal operation of the operating system such as the power management process (mainly used to control parts of the operating system related to the power source, and when the process is in the uninterruptible sleep state for a long time, a screen of the terminal device may not become dark or become bright, thereby affecting the normal operation of the operating system), and under this condition, the terminal device exits all of the processes in the kernel space, and the restarts the operating system to resume the normal operation of the operating system. When the N processes includes at least one system process, and none of the at least one system process can affect the normal operation of the operating system, under this condition, the terminal device exits at least one of the N processes to ensure the stability of the operating system. The at least one system includes the N processes, that is to say, the terminal device can exit all of the N processes.

In at least one implementation, a specific implementation manner of the operation at block 102 includes the follows. When positions of the resources occupied by the N processes are the same, the terminal device changes the states of N−1 processes of the N processes to the exit state, and controls the operating system to pause the N−1 processes.

For example, generally, one resource is occupied by one process. When the N processes occupy one resource, a condition that all of the processes cannot be run may occur, which results in that the processes are in the uninterruptible sleep state for a long time. Under this condition, the terminal device can select to run one of the N processes, and pause the other N−1 processes, and the specific implementation manner is the above, such that it can ensure that the N processes can operate normally without exit.

In at least one implementation, when the states of the N processes are changed to the exit state, after the operation at block 102, the method illustrated in FIG. 1 further includes following operations. When a percentage of occupied resources of the kernel space is less than or equal to a first threshold, the terminal device launches the N processes according to the statistic information of the N processes. When the percentage of the occupied resources of the kernel space is greater than the first threshold and less than a second threshold, the terminal device selects W processes from the N processes, and launches the W processes according to the statistic information of the W processes. Priorities of the W processes are higher than or equal to that of processes of the N processes other than the W processes, and W is an integer greater than or equal to 1.

For example, it is assumed that the N processes are in the uninterruptible sleep state for a long time, the terminal device directly changes the states of the N processes to the exit state, and then controls the operating system to exit the N processes. If a user wants to resume the N processes, a common manner is that the N processes are launched in response to user operation. In the solution, the terminal device can directly launch the N processes when the percentage of the occupied resources of the kernel space is less than or equal to the first threshold, thereby improving user experience. The first threshold may be 20%, 25%, 30%, 32% for example or other value. In addition, when the percentage of the occupied resources of the kernel space is greater than the first threshold and less than the second threshold, the terminal device can launch the W processes of the N processes, and the priorities of the W processes are higher. For example, when N is four, W is two, a relationship among the priorities of the N processes is that the priority of the first process is higher than that of the third process, the priority of the third process is higher than that of the fourth process, and the priority of the fourth process is higher than that of the second process, then the launched W processes are the first process and the third process. A manner in which the processes are launched is that the terminal device launches the processes according to the statistic information of the processes stored at a time point that the processes exited last time. For example, the statistic information of the process A stored at a time point the process A exited last time includes the identifier of the process A (ID1), the state of the process A before the state of the process A is changed is the uninterruptible sleep state, the state of data information of the process A is that 50% of data has been transmitted, the operating system launches the process A according to the identifier of the process A, causes the process A to enter the uninterruptible sleep state, and causes the process A to transmit data from 50% of data.

Figure 2:
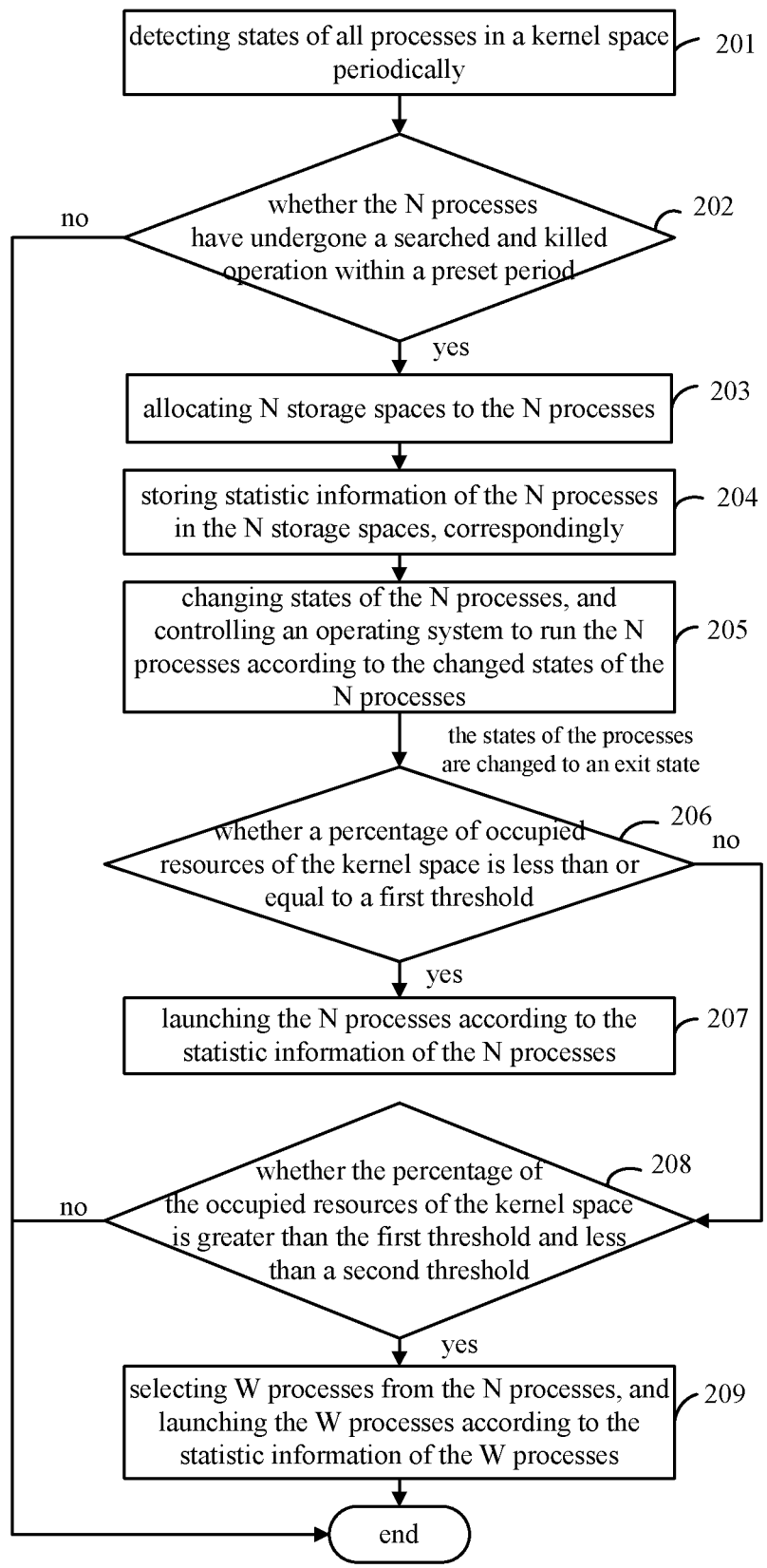
FIG. 2 is a schematic flow chart illustrating another method for controlling process according to an implementation of the present disclosure.

The implementations of the present disclosure further provide another detailed method. As illustrated in FIG. 2, the method begins at block 201.

At block 201, the terminal device periodically detects states of all processes in a kernel space. When the terminal device detects that a duration that each of N processes in the kernel space is in an uninterruptible sleep state reaches or exceeds a preset period, an operation at block 202 is executed. N is an integer greater than or equal to 1.

At block 202, the terminal device detects whether the N processes have undergone a searched and killed operation within the preset period. When yes, an operation at block 203 is executed, otherwise no operation is performed.

At block 203, the terminal device allocates N storage spaces to the N processes, and the N storage spaces are in a one-to-one correspondence relationship with the N processes.

At block 204, the terminal device stores statistic information of the N processes in the N storage spaces, correspondingly.

At block 205, the terminal device changes states of the N processes, and controls an operating system to run the N processes according to the changed states of the N processes.

At block 206, when the states of the N processes are changed to an exit state, the terminal device determines whether a percentage of occupied resources of the kernel space is less than or equal to a first threshold. When yes, the operation at block 207 is executed, otherwise the operation at block 208 is executed.

At block 207, the terminal device launches the N processes according to the statistic information of the N processes.

At block 208, the terminal device determines whether the percentage of the occupied resources of the kernel space is greater than the first threshold and less than a second threshold. When yes, an operation at block 209 is executed, otherwise no operation is performed.

At block 209, the terminal device selects W processes from the N processes, and launches the W processes according to the statistic information of the W processes. Priorities of the W processes are higher than or equal to that of processes of the N processes other than the W processes, and W is an integer greater than or equal to 1.

What needs to be illustrated is that for a specific implementation manner of each operation illustrated in FIG. 2, the specific implementation manners in the method illustrated in FIG. 1 can be referred, which will not be repeated herein.

Figure 3:
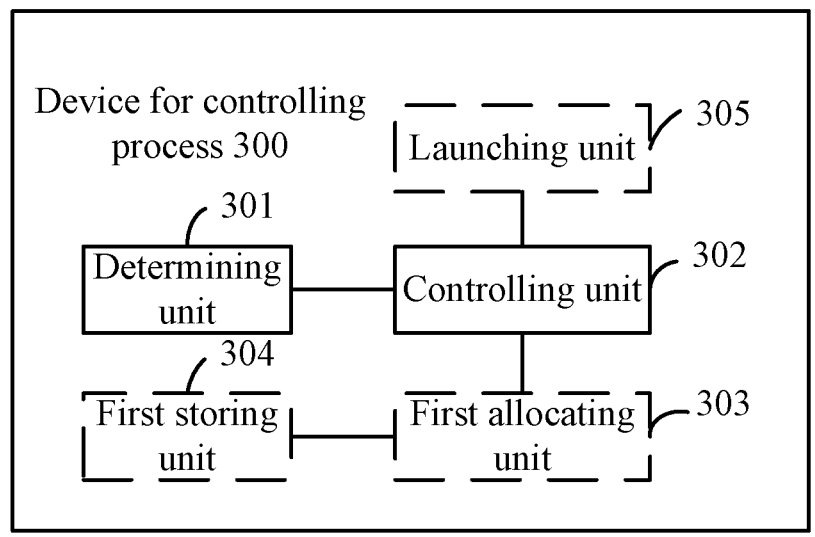
FIG. 3 is a schematic structural diagram illustrating a device for controlling process according to an implementation of the present disclosure.

The implementations of the present disclosure further provide a device 300 for controlling process. As illustrated in FIG. 3, the device 300 includes a determining unit 301 and a controlling unit 302.

The determining unit 301 is configured to determine whether N processes in a kernel space of a terminal device have undergone a searched and killed operation within a preset period, when it is detected that a duration that each of the N processes is in an uninterruptible sleep state reaches or exceeds the preset period. N is an integer greater than or equal to 1.

The controlling unit 302 is configured to change states of the N processes based on a determination that the N processes have undergone the searched and killed operation within the preset period, and control an operating system of the terminal device to run the N processes according to the changed states of the N processes.

In at least one implementation, the device illustrated in FIG. 3 further includes a first allocating unit 303 and a first storing unit 304.

The first allocating unit 303 is configured to allocate N storage spaces to the N processes. The N storage spaces are in a one-to-one correspondence relationship with the N processes.

The first storing unit 304 is configured to store statistic information of the N processes in the N storage spaces, correspondingly.

In at least one implementation, the device illustrated in FIG. 3 further includes a grouping unit, a second allocating unit, and a second storing unit, all of which are not shown in FIG. 3.

The grouping module is configured to group the N processes to obtain K groups of process sets. Types of the processes in each process set are the same.

The second allocating module is configured to allocate K storage spaces to the K groups of process sets. The K storage spaces are in a one-to-one correspondence relationship exists with the K groups of process sets.

The second storing module is configured to store the statistic information of the K groups of process sets in the K storage spaces, correspondingly.

In at least one implementation, the statistic information of one process at least contains an identifier of the process. Each time the operating system runs a process, the operating system creates a process ID, the process ID is the identifier of the process, and the identifier of the process is configured to distinguish different processes. The statistic information of one process may further contain at least one of the follows: a state of the process before the state of the process is changed, a duration that the process is in the uninterruptible sleep state, and a state of data information of the process.

In at least one implementation, when the N processes includes at least one system process, the controlling unit 302 is configured to change the states of all of the processes in the kernel space to an exit state when one of the at least one system process affects normal operation of the operating system, and control the operating system to exit all of the processes in the kernel space and restart the operating system. The controlling unit 302 is further configured to change the state of at least one of the N processes to the exit state when none of the at least one system process affects the normal operation of the operating system, and control the operating system to exit the at least one of the N processes.

In at least one implementation, the controlling unit 302 is configured to change the states of N−1 processes of the N processes to a pause state when positions of resources occupied by the N processes are the same, and control the operating system to pause the N−1 processes.

In at least one implementation, the device illustrated in FIG. 3 further includes a launching unit 305 configured to launch the N processes according to statistic information of the N processes when a percentage of occupied resources of the kernel space is less than or equal to a first threshold, based on that the states of the N processes are changed to the exit state. The launching unit 305 is further configured to select W processes from the N processes when the percentage of the occupied resources of the kernel space is greater than the first threshold and less than a second threshold, and launch the W processes according to the statistic information of the W processes. Priorities of the W processes are higher than or equal to that of processes of the N processes other than the W processes, and W is an integer greater than or equal to 1.

In at least one implementation, with regard to changing the states of the N processes, the controlling unit 302 is configured to change the states of the N processes from the uninterruptible sleep state to the exit state or the pause state.

What needs to be illustrated is that the above units (the determining unit 301, the controlling unit 302, the first allocating unit 303, the first storing unit 304, and the launching unit 305) are configured to perform the related operations of the methods illustrated in FIG. 1 and FIG. 2.

In the implementation, the device 300 for controlling process is in the form of units. The "units" herein can be referred to an application-specific integrated circuit (ASIC), a processor executing one or more software or hardware programs, a memory, an integrated logic circuit, and/or other devices which can provide the above functions. Additionally, the determining unit 301, the controlling unit 302, the first allocating unit 303, the first storing unit 304, and the launching unit 305 can be implemented via a processor 401 of a terminal device illustrated in FIG. 4.

Figure 4:
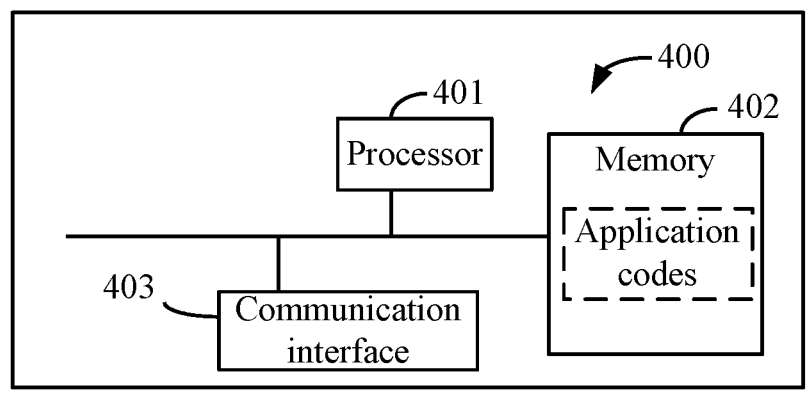
FIG. 4 is a schematic structural diagram illustrating a terminal device according to an implementation of the present disclosure.

As illustrated in FIG. 4, a terminal device 400 may be implemented in the structure of FIG. 4, and the terminal 400 may include at least one processor 401, at least one memory 402, and at least one communication interface 403. The processor 401, the memory 402, and the communication interface 403 can connect and communicate with each other via communication buses.

The processor 401 may be one of a central processing unit (CPU), a micro-processor, an application-specific integrated circuit (ASIC), or one or more integrated circuits for controlling the programs for the implementation of the above-mentioned technical solutions.

The communication interface 403 is configured to communicate with other devices or communication networks such as Ethernet, radio access network (RAN), wireless local area network (WLAN) and the like.

The memory 402 may be a read-only memory (ROM) or other types of static storage devices that can store static information and instructions, a random access memory (RAM) or other types of dynamic storage devices that can store information and instructions, or may be an electrically erasable programmable read-only memory (EEPROM), a compact disc read-only memory (CD-ROM) or other disc storage media, disc storage media (including compact discs, laser discs, compact discs, digital versatile discs, Blu-ray discs and the like), disk storage media or other magnetic storage devices, or may be any other media that can be used to carry or store desired program codes in the form of instructions or data structures and that can be accessed by a computer. The present disclosure is not limited thereto. The memory can exist independently and can be connected to the processor via the bus. The memory can also be integrated with the processor.

The memory 402 is configured to store at least one executable instruction therein. When the at least one executable instruction in the memory 402 is executed by the processor 401, the processor 401 is caused to carry out actions.

In at least one implementation, the processor 401 is caused to determine whether N processes in a kernel space of the terminal device have undergone a searched and killed operation within a preset period when a duration that each of the N processes in the kernel space is in an uninterruptible sleep state reaches or exceeds the preset period. N is an integer greater than or equal to 1. The processor 401 is further caused to change states of the N processes based on a determination that the N processes have undergone the searched and killed operation within the preset period, and control an operating system to run the N processes according to the changed states of the N processes.

In the implementation, a problem of the operating system generated by that some processes are in the uninterruptible sleep state for a long time can be avoided, thereby improving the stability of the operating system.

In at least one implementation, the processor 401 is further caused to allocate N storage spaces to the N processes, and the N storage spaces are in a one-to-one correspondence relationship with the N processes. The processor 401 is further caused to store statistic information of the N processes in the N storage spaces, correspondingly, and the statistic information of each of the N processes at least contains an identifier of the process.

In at least one implementation, the processor 401 is further caused to obtain K groups of process sets by grouping the N processes, and each process set has processes of the same type. The processor 401 is further caused to allocate K storage spaces to the K groups of process sets, and the K storage spaces are in a one-to-one correspondence relationship with the K groups of process sets. The processor 401 is further caused to store the statistic information of the K groups of process sets in the K storage spaces, correspondingly, and the statistic information of each of the N processes at least contains an identifier of the process.

In at least one implementation, the statistic information of one process further contains at least one of the follows: a state of the process before changing the state of the process, a duration that the process is in the uninterruptible sleep state, and a state of data information of the process.

In at least one implementation, when the N processes include at least one process generated when at least one system software of the terminal device is run, the processor 401 caused to change the states of the N processes and control the operating system to run the N processes according to the changed states of the N processes is caused to change the states of all processes in the kernel space to an exit state when one of the at least one process generated when the at least one system software is running causes the operating system to be abnormal, and control the operating system to exit all processes in the kernel space and restart the operating system, and change the state of at least one of the N processes to the exit state when none of the at least one process generated when the at least one system software is running causes the operating system to be abnormal, and control the operating system to exit the at least one of the N processes.

In at least one implementation, the processor 401 caused to change the states of the N processes and control the operating system to run the N processes according to the changed states of the N processes is caused to change the states of N−1 processes of the N processes to a pause state when positions of resources occupied by the N processes are the same, and control the operating system to pause the N−1 processes.

In at least one implementation, when the states of the N processes are changed to an exit state, after controlling the operating system to run the N processes according to the changed states of the N processes, the processor 401 is further caused to launch the N processes according to statistic information of the N processes when a percentage of occupied resources of the kernel space is less than or equal to a first threshold, select W processes from the N processes when the percentage of the occupied resources of the kernel space is greater than the first threshold and less than a second threshold, and launch the W processes according to statistic information of the W processes. The statistic information of each of the N processes at least contains an identifier of the process. Priorities of the W processes are higher or equal to that of processes of the N processes other than the W processes, and W is an integer greater than or equal to 1.

In at least one implementation, the processor 401 caused to change states of the N processes is caused to change the states of the N processes from the uninterruptible sleep state to an exit state or a pause state.

In at least one implementation, the processor 401 is caused to determine whether a duration that at least one process that is unable to be killed stays in a kernel space of the terminal device reaches or exceeds a preset period, and change state of the at least one process based on a determination that the duration that the at least one process stays in the kernel space reaches or exceeds the preset period, and control an operating system of the terminal device to run the at least one process after the state of the at least one process is changed.

Figure 5:
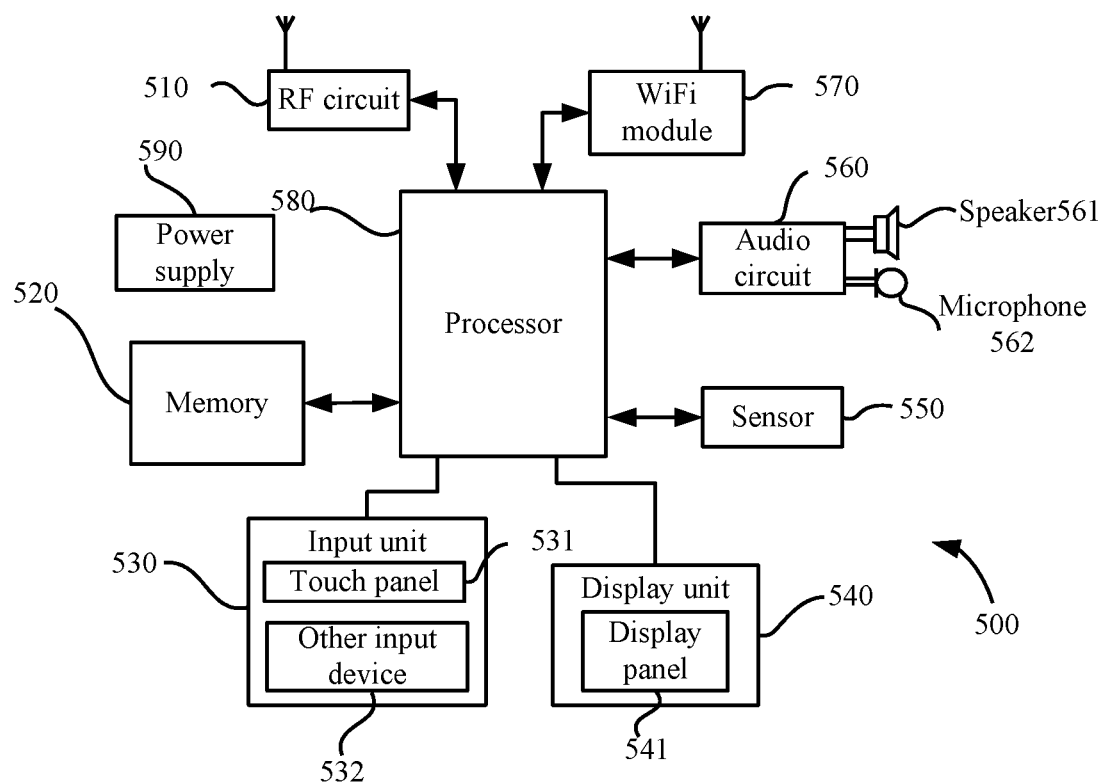
FIG. 5 is a schematic structural diagram illustrating another terminal device according to an implementation of the present disclosure.

The implementations of the present disclosure further provide a more specific application scenario in which the terminal is a mobile phone and the following describes various components of the mobile phone in detail with reference to FIG. 5.

An RF circuit 510 is configured to receive and transmit information, or receive and transmit signals during a call, and in particular, receive downlink information from a base station and transfer the downlink information to the processor 580 for processing, and transmit uplink data to the base station. Generally, the RF circuit 510 includes but is not limited to an antenna, at least one amplifier, a transceiver, a coupler, a low noise amplifier (LNA), a duplexer and the like. In addition, the RF circuit 510 may also communicate with the network and other devices by wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 520 is configured to store software programs and modules, and the processor 580 is configured to execute various function applications and data processing of the mobile phone by running the software programs and the modules stored in the memory 520. The memory 520 mainly includes a program storage area and a data storage area. The program storage area may store an operating system, application programs required for at least one function (for example, a function of determining processes, a function of changing states of processes, a function of allocating storage space, and so on) and so on. The data storage area may store data (for example, statistics information of processes, killed record of processes, and so on) created according to use of the mobile phone, and so on. In addition, the memory 520 may include a high-speed RAM, and may further include a non-volatile memory such as at least one disk storage device, a flash device, or other non-volatile solid storage devices.

The input unit 530 may be configured to receive input digital or character information and generate key signal input associated with user setting and function control of the mobile phone. Specifically, the input unit 530 may include a touch panel 531, and other input devices 532. The touch panel 531, also referred to as a touch screen, may receive a touch operation of the user thereon or nearby (e.g., operation on or near the touch panel 531 by a user using a finger or stylus, or any suitable object or attachment), and drive a corresponding connection device according to a pre-set program. Optionally, the touch panel 531 may include a touch detection device and a touch controller. The touch detection device detects the touching orientation of the user and detects a signal resulted from the touch operation, and transmits the signal to the touch controller. The touch controller receives the touch information from the touch detection device and converts the information into contact coordinates and sends the contact coordinates to the processor 580, and can receive and execute the command sent by the processor 580. In addition, the touch panel 531 can be realized using various types such as resistive, capacitive, infrared, and surface acoustic waves. In addition to the touch panel 531, the input unit 530 may still include other input devices 532. Specifically, the other input devices 532 may include, but is not limited to, at least one of a physical keyboard, function keys (such as volume control buttons, switch buttons and so on), a trackball, a mouse, and a joystick.

The display unit 540 is configured to display information input by the user or information provided for the user or various menus of the mobile phone. The display unit 540 may include a display panel 541, and alternatively, the display panel 541 may be in the form of a liquid crystal display (LCD), an organic light-emitting diode (OLED) and so on. Furthermore, the touch panel 531 may cover the display panel 541. When the touch panel 531 detects a touch operation thereon or nearby, information of the touch operation can be transmitted to the processor 580 so as to determine the type of the touch event. The processor 580 provides corresponding visual output on the display panel 541 according to the type of the touch event. Although in FIG. 5, the touch panel 531 and the display panel 541 are used as two separate components to realize the input and output functions of the mobile phone, in some implementations, the touch panel 531 may be integrated with the display panel 541 to implement the input and output functions of the mobile phone.

The mobile phone may also include at least one sensor 550, such as a light sensor, a motion sensor, and other sensors. Specifically, the light sensor may include an ambient light sensor and a proximity sensor, among which the ambient light sensor may adjust the brightness of the display panel 541 according to ambient lights, and the proximity sensor may turn off the display panel 541 and/or backlight when the mobile phone reaches nearby the ear. As a kind of motion sensor, the accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, which will not be repeated herein.

The audio circuit 560, the speaker 561, the microphone 562 may provide an audio interface between the user and the mobile phone. The audio circuit 560 may convert the received audio data into electrical signals and transfer the electrical signals to the speaker 561; thereafter the speaker 561 converts the electrical signals into sound signals to output. On the other hand, the microphone 562 converts the received sound signals into electrical signals, which are received and converted into audio data by the audio circuit 560 to output. The audio data is then processed and transmitted by the processor 580 via an RF circuit 510 to another mobile phone for example, or, the audio data is output to the memory 520 for further processing.

Wi-Fi belongs to a short-range wireless transmission technology. With aid of the Wi-Fi module 570, the mobile phone may assist the user in E-mail receiving and sending, webpage browsing, access to streaming media and the like. Wi-Fi provides users with wireless broadband Internet access. Although the Wi-Fi module 570 is illustrated in FIG. 5, it can be understood that the Wi-Fi module 570 is not essential to the mobile phone and can be omitted according to actual needs without departing from the essential nature of the present disclosure.

The processor 580 is the control center of the mobile phone, it connects various parts of the whole mobile phone through various interfaces and lines, runs or executes software programs and/or modules stored in the memory 520, and invokes data stored in the memory 520 to perform various functions of the mobile phone and process data, thereby monitoring the mobile phone as a whole. Optionally, the processor 580 may include one or more processing units; for example, the processor 580 may integrate an application processor and a modem processor, where the application processor handles the operating system, the user interface, the application, and so on, and the modem processor mainly processes wireless communication. It can be understood that the above-mentioned modem processor may not be integrated into the processor 580.

The mobile phone also includes a power supply 590 (e.g., a battery) that supplies power to various components. Preferably, the power supply may be logically connected to the processor 580 via a power management system to enable management of charging, discharging, and power consumption through the power management system.

Although not illustrated, the mobile phone may further include a camera, a Bluetooth® module, and so on, which will not be repeated herein.

In the above implementations, various steps in each method may be implemented based on the structure of the terminal device illustrated in FIG. 5.

The implementations of the present disclosure also provide a computer storage medium. The computer storage medium stores programs which, when executed, to execute all or a part of the steps of any of the methods for controlling process described in the above-described method implementations.

The implementations of the present disclosure also provide a computer program product. The computer program product includes a non-transitory computer readable storage medium that stores computer programs. The computer programs are operable with a computer to perform all or a part of the steps of any of the above methods executed by the terminal device. The computer program product may be acted as a software installation package.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the present disclosure, the apparatus disclosed in the implementations may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or a part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or a part of the technical solutions, may be embodied in the form of a software product which is stored in a memory and includes instructions for causing a computer device (which may be a personal computer, a server, or a network device and so on) to perform all or a part of the steps described in the various method implementations of the present disclosure. The memory includes various medium capable of storing program codes, such as a USB (universal serial bus) flash disk, a read-only memory (ROM), a random-access memory (RAM), a movable hard disk, a disk, a compact disc (CD), or the like.

It will be understood by those of ordinary skill in the art that all or a part of the various method implementations described above may be accomplished by means of a program to instruct associated hardware, the program may be stored in a computer-readable memory, which may include a flash memory, a read-only memory (ROM), a random-access memory (RAM), a disk or a compact disc (CD), and so on.

The above illustrates the implementations of the present disclosure in detail. The specification employs specific examples to illustrate the principle and implementation manners of the present disclosure. The illustration of the above implementations is just used to help in understanding of the method and core concept of the present disclosure. Meanwhile, for a person ordinarily skilled in the art, depending on the concept of the present disclosure, changes may be made on the specific implementations and application range. In conclusion, the content of the specification shall not be understood to limit the present disclosure.

What is claimed is:

1. A method for controlling process, comprising:
    determining whether a watchdog program has performed an operation for searching for and attempting to kill N processes in a kernel space of a terminal device within a preset period when a duration that each process among the N processes is in an uninterruptible sleep state reaches or exceeds the preset period, wherein the N processes being in the uninterruptible sleep state indicates that the N processes are in a sleep state and unable to respond to asynchronous signals containing searching and killing signals, and N is an integer greater than or equal to 1; and
    changing states of the N processes and controlling an operating system of the terminal device to run the N processes according to the changed states of the N processes based on a determination that within the preset period the watchdog program has performed the operation, wherein the N processes in the uninterruptible sleep state are unable to be killed after being subject to the operation performed by the watchdog program.

2. The method of claim 1, further comprising:
    prior to changing the states of the N processes:
        allocating N storage spaces to the N processes, wherein the N storage spaces are in a one-to-one correspondence relationship with the N processes; and
        storing statistic information of the N processes in the N storage spaces, correspondingly, wherein the statistic information of each of the N processes at least contains an identifier of the process.

3. The method of claim 2, wherein the statistic information of the each of the N processes further comprises at least one of: a state of the process before changing the state of the process, a duration that the process is in the uninterruptible sleep state, and a state of data information of the process.

4. The method of claim 1, further comprising:
    prior to changing the states of the N processes:
        obtaining K groups of process sets by grouping the N processes, wherein each process set has processes of the same type;
        allocating K storage spaces to the K groups of process sets, wherein the K storage spaces are in a one-to-one correspondence relationship with the K groups of process sets; and
        storing statistic information of the K groups of process sets in the K storage spaces, correspondingly, wherein the statistic information of each of the N processes at least comprises an identifier of the process.

5. The method of claim 1, wherein when the N processes comprise at least one process generated when at least one system software of the terminal device is running, changing the states of the N processes and controlling the operating system to run the N processes according to the changed states of the N processes comprises:
    changing the states of all processes in the kernel space to an exit state when one of the at least one process generated when the at least one system software is running causes the operating system to be abnormal, and controlling the operating system to exit all processes in the kernel space and restarting the operating system; and
    changing the state of at least one of the N processes to the exit state when none of the at least one process generated when the at least one system software is running causes the operating system to be abnormal, and controlling the operating system to exit the at least one of the N processes.

6. The method of claim 1, wherein changing the states of the N processes and controlling the operating system to run the N processes according to the changed states of the N processes comprises:
    changing the states of N−1 processes of the N processes to a pause state when positions of resources occupied by the N processes are the same, and controlling the operating system to pause the N−1 processes.

7. The method of claim 1, wherein when the states of the N processes are changed to an exit state, the method further comprises:
    after controlling the operating system to run the N processes according to the changed states of the N processes:
        launching the N processes according to statistic information of the N processes when a percentage of occupied resources of the kernel space is less than or equal to a first threshold, wherein the statistic information of each of the N processes at least comprises an identifier of the process; and
        selecting W processes from the N processes when the percentage of the occupied resources of the kernel space is greater than the first threshold and less than a second threshold, and launching the W processes according to statistic information of the W processes, wherein priorities of the W processes are higher than or equal to that of processes of the N processes other than the W processes, and W is an integer greater than or equal to 1.

8. The method of claim 1, wherein changing the states of the N processes comprises:
    changing the states of the N processes from the uninterruptible sleep state to an exit state or a pause state.

9. A terminal device, comprising:
    at least one processor; and
    a computer readable memory, coupled to the at least one processor and storing at least one computer executable instruction therein which, when executed by the at least one processor, causes the at least one processor to:

determine whether a watchdog program has performed an operation for searching for and attempting to kill N processes in a kernel space of the terminal device within a preset period when a duration that each process among the N processes is in an uninterruptible sleep state reaches or exceeds the preset period, wherein the N processes being in the uninterruptible sleep state indicates that the N processes are in a sleep state and unable to respond to asynchronous signals containing searching and killing signals, and N is an integer greater than or equal to 1; and change states of the N processes and control an operating system of the terminal device to run the N processes according to the changed states of the N processes based on a determination that within the preset period the watchdog program has performed the operation, wherein the N processes in the uninterruptible sleep state are unable to be killed after being subject to the operation performed by the watchdog program.

10. The terminal device of claim 9, wherein the at least one processor is further caused to:

prior to changing the states of the N processes:
allocate N storage spaces to the N processes, wherein the N storage spaces are in a one-to-one correspondence relationship with the N processes; and
store statistic information of the N processes in the N storage spaces, correspondingly, wherein the statistic information of each of the N processes at least comprises an identifier of the process.

11. The terminal device of claim 10, wherein the statistic information of the each of the N processes further comprises at least one of: a state of the process before changing the state of the process, a duration that the process is in the uninterruptible sleep state, and a state of data information of the process.

12. The terminal device of claim 9, wherein the at least one processor is further caused to:

prior to changing the states of the N processes:
obtain K groups of process sets by grouping the N processes, wherein each process set has processes of the same type;
allocate K storage spaces to the K groups of process sets, wherein the K storage spaces are in a one-to-one correspondence relationship with the K groups of process sets; and
store the statistic information of the K groups of process sets in the K storage spaces, correspondingly, wherein the statistic information of each of the N processes at least comprises an identifier of the process.

13. The terminal device of claim 9, wherein when the N processes comprise at least one process generated when at least one system software of the terminal device is running, the at least one processor caused to change the states of the N processes and control the operating system to run the N processes according to the changed states of the N processes is caused to:

change the states of all processes in the kernel space to an exit state when one of the at least one process generated when the at least one system software is running causes the operating system to be abnormal, and control the operating system to exit all processes in the kernel space and restart the operating system; and
change the state of at least one of the N processes to the exit state when none of the at least one process generated when the at least one system software is running causes the operating system to be abnormal, and control the operating system to exit the at least one of the N processes.

14. The terminal device of claim 9, wherein the at least one processor caused to change the states of the N processes and control the operating system to run the N processes according to the changed states of the N processes is caused to:

change the states of N−1 processes of the N processes to a pause state when positions of resources occupied by the N processes are the same, and control the operating system to pause the N−1 processes.

15. The terminal device of claim 9, wherein when the states of the N processes are changed to an exit state, the at least one processor is further caused to:

after controlling the operating system to run the N processes according to the changed states of the N processes:
launch the N processes according to statistic information of the N processes when a percentage of occupied resources of the kernel space is less than or equal to a first threshold, wherein the statistic information of each of the N processes at least comprises an identifier of the process; and
select W processes from the N processes when the percentage of the occupied resources of the kernel space is greater than the first threshold and less than a second threshold, and launch the W processes according to statistic information of the W processes, wherein priorities of the W processes are higher than or equal to that of processes of the N processes other than the W processes, and W is an integer greater than or equal to 1.

16. The terminal device of claim 9, wherein the at least one processor caused to change the states of the N processes is caused to:

change the states of the N processes from the uninterruptible sleep state to an exit state or a pause state.

17. A non-transitory computer readable storage medium configured to store computer programs which, when executed by a processor of a terminal device, causes the processor to carry out actions, comprising:

determining whether a watchdog program has performed an operation for searching for and attempting to kill N processes in a kernel space of the terminal device within a preset period when a duration that each process among the N processes is in an uninterruptible sleep state reaches or exceeds the preset period, wherein the N processes being in the uninterruptible sleep state indicates that the N processes are in a sleep state and unable to respond to asynchronous signals containing searching and killing signals, and N is an integer greater than or equal to 1; and changing states of the N processes and controlling an operating system of the terminal device to run the N processes according to the changed states of the N processes, based on a determination that within the preset period the watchdog program has performed the operation, wherein the N processes in the uninterruptible sleep state are unable to be killed after being subject to the operation performed by the watchdog program.

18. The non-transitory computer readable storage medium of claim 17, wherein the computer programs, when executed by the processor, are further configured to carry out actions, comprising:

prior to changing the states of the N processes:

obtaining K groups of process sets by grouping the N processes, wherein each process set has processes of the same type;

allocating K storage spaces to the K groups of process sets, wherein the K storage spaces are in a one-to-one correspondence relationship with the K groups of process sets; and storing statistic information of the K groups of process sets in the K storage spaces, correspondingly, wherein the statistic information of each of the N processes at least comprises an identifier of the process.

19. The non-transitory computer readable storage medium of claim 17, wherein the computer programs executed by the processor to carry out the action of changing the states of the N processes and controlling the operating system to run the N processes according to the changed states of the N processes are configured to carry out actions, comprising:

changing the states of N−1 processes among the N processes to a pause state when positions of resources occupied by the N processes are the same, and controlling the operating system to pause the N−1 processes.

20. The non-transitory computer readable storage medium of claim 17, wherein when the states of the N processes are changed to an exit state, the computer programs, when executed by the processor, are further configured to carry out actions, comprising:

after controlling the operating system to run the N processes according to the changed states of the N processes:

launching the N processes according to statistic information of the N processes when a percentage of occupied resources of the kernel space is less than or equal to a first threshold, wherein the statistic information of each of the N processes at least comprises an identifier of the process; and selecting W processes from the N processes when the percentage of the occupied resources of the kernel space is greater than the first threshold and less than a second threshold, and launching the W processes according to statistic information of the W processes, wherein priorities of the W processes are higher than or equal to that of processes of the N processes other than the W processes, and W is an integer greater than or equal to 1.

* * * * *